June 1, 1965

M. KATES 3,187,226

MINIATURIZED ELECTRICAL APPARATUS WITH COMBINED HEAT
DISSIPATING AND INSULATING STRUCTURE

Filed Aug. 7, 1961

INVENTOR.
MAURICE KATES

BY

HIS ATTORNEY

3,187,226
MINIATURIZED ELECTRICAL APPARATUS WITH COMBINED HEAT DISSIPATING AND INSULATING STRUCTURE

Maurice Kates, Newton, Mass., assignor, by mesne assignments, to Curtiss-Wright Corporation, New York, N.Y., a corporation of Delaware
Filed Aug. 7, 1961, Ser. No. 129,771
2 Claims. (Cl. 317—100)

This invention relates to miniaturized electrical apparatus, including electrical units such as resistors, transformers, transistors and the like, that are subject to localized heating during normal use, having improved means for effectively removing the heat from said electrical units and also for mounting and insulating said units.

Heretofore certain types of compactly assembled electrical apparatus, such as miniaturized circuit modules having plastic-type chassis on which are mounted electrical units, have not performed satisfactorily under conditions of high ambient temperature where heat transfer rate is comparatively low. In such cases, the heat generated by the electrical units tends to concentrate and produce spot or local overheating, especially adjacent the plastic mounting. The presently used insulating materials including epoxy and other associated plastics are limited in their heat dissipating characteristics, with the result that localized overheating causes rapid deterioration of the material and consequent failure of function. This is a serious problem where operation is at radio frequency, since the insulation must have both low dielectric loss and high temperature characteristics.

Heat conducting structure or "heat sinks," such as aluminum and magnesium locks have been used in various structural ways with circuit modules for dissipating excess heat; however, the rate of heat transfer from the heated unit to the available heat dissipating surfaces has not been sufficiently rapid and effective, consistent with simplicity of construction and space and weight limitations.

In accordance with this invention, a simplified construction overcomes the above problem of combined heat dissipation and high dielectric electrical insulation and also provides direct securing means for attaching the electrical unit to its support. To this end the electrical unit and support are structurally united by an electrically insulating and thermally conductive plastic cement to form a combined insulating, heat dissipating and securing means for the electrical units. Such cement preferably consists of beryllium oxide in a suitable binder for both insulating and mounting the miniaturized electrical units. The units may be directly connected to good heat dissipating surfaces while being adequately insulated therefrom. Beryllium oxide is especially suitable for this purpose as it has the following characteristics:

(1) It is an electrical non-conductor with a dielectric constant, $10^7$ c.p.s., of 5.9;

(2) It is a thermal conductor, having a conductivity B.t.u./hr./ft.$^2$/F/ft. of 125;

(3) It is light in weight (specific gravity about 3) and has good mechanical strength.

The oxide of beryllia is available in comminuted or powdered form so that it can be mixed or compounded with a high temperature plastic-type binder for producing an adhering heat conductive cement of high dielectric strength, or a combined heat and insulating electrical supporting structure.

The invention will be more fully set forth in the following description referring to the accompanying drawing, and the features of novelty will be pointed out with particularity in the claims annexed to and forming a part of this specification.

Referring to the drawing.

Figure 1:
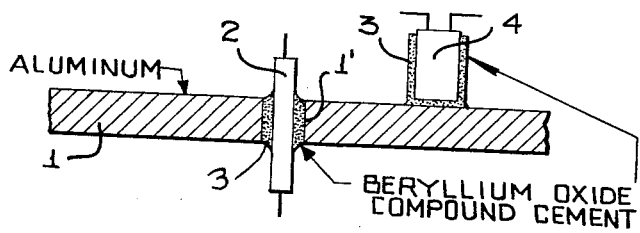
FIG. 1 is an elevational view, partly in section, of electrical apparatus embodying the present invention.

Referring to FIG. 1, there is shown one form of the invention wherein a chassis or supporting panel 1 is composed of a good heat conducting metal, such as aluminum, and has mounted therein an electrical resistor 2. For clarity of description the physical description and dimensions of miniaturized apparatus are not represented here.

In the above form, the resistor extends through an enlarged bore 1' in the chassis and is secured to and spaced from the chassis by a beryllium cement 3. The cement preferably consists of a compound or mixture of 60% to 95% beryllium oxide and 5% to 40% plastic binder. The binder can be RTV silicon rubber, a silicon plastic or any other suitable high temperature rubber-like plastic. The resulting compound has good adhering quality and flexibility, so that it can be used to secure the electrical resistor directly in place on the heat-dissipating chassis in optimum heat transfer relation thereto. The interposed cement also electrically insulates the resistor from the chassis and, due to its flexibility, provides for relative expansion and contraction of the parts without strain during wide temperature variations.

In FIG. 1, the resistor 2 is surrounded at its mid portion by the beryllium cement 3 for mechanical union with the aluminum chassis. Thus a direct heat transfer path of minimum distance is established between the resistor and the heat dissipating chassis.

Also in FIG. 1 there is shown another application of the invention wherein an electrical component, such as a transistor 4, is mounted on the chassis and is coated along its lower and lateral sides with the beryllium oxide compound 3. The transistor is thus secured directly to the panel at its lower side, thereby ensuring effective heat transfer path, and also is provided with maximum heat radiating surface.

Summarizing, the coating of beryllium oxide compound provides a high "K" radiating path directly from the transistor to the outside radiating surface, while also providing a direct low resistance heat conducting path to the chassis.

Figure 2:
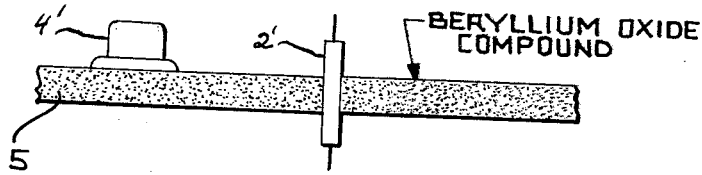
FIG. 2 is a similar view illustrating another form of the invention.

FIG. 2 shows another form of the invention wherein the heat dissipating chassis consists of a panel or block 5 composed of the beryllium oxide compound itself. The beryllium oxide is comminuted as to desired grain coarseness in this case, and is compounded with a suitable binder-plastic to form a self-sustaining rigid panel or sheet that directly supports the heat generating electrical units.

The block 5 may be cast or molded into solid form according to the mechanical characteristics desired. The binder can be any suitable plastic having desired thermoset characteristics, and is in minimum amount consistent with the mechanical strength required.

In this application of the invention, the electrical units such as the resistor 2' and the transistor 4' can be in direct heat-transfer relation with the chassis itself, since the chassis also comprises the insulating support.

Figure 3:
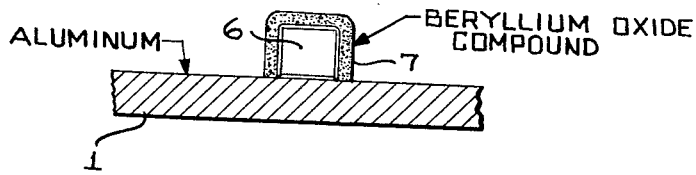
FIG. 3 is a similar view, illustrating a further application of the form of FIG. 2.

In FIG. 3 there is shown a somewhat similar application wherein an electrical unit 6 (transistor, transformer, etc.) is enclosed or encapsulated in a molded casing 7 formed of the beryllium oxide compound as in FIG. 2. Here, the casing 7 serves to conduct heat from the entire peripheral surface of the unit and to dissipate it by conduction to the aluminum chassis and by radiation, generally in the manner of the beryllium oxide cement coating of FIG. 1. The casing may be cast or molded in different configurations to form a completely enclosing capsule, in which case it can be suitably secured to the panel; or it may partly enclose the electrical unit which in turn may be directly secured at its seat by the beryllium oxide cement to a heat dissipating chassis.

By reason of the high dielectric strength and low loss factor of the beryllium oxide capsule, it may also be used for electrical shielding in certain micro-wave applications.

The encapsulating arrangement of FIG. 3 can of course be used as desired with either an aluminum chassis or a beryllium oxide chassis as indicated in FIG. 2.

It should be understood that this invention is not limited to specific details of construction and arrangement thereof herein illustrated, and that changes and modifications may occur to one skilled in the art without departing from the spirit of the invention.

What is claimed is:

1. Electrical miniaturized apparatus including an electrical unit that generates heat during normal operation thereof, comprising a supporting heat-dissipating chassis for said unit, and an integral, compact structure for securing to and insulating said unit from said chassis and for effectively conducting the aforesaid heat to the chassis, said integral structure consisting of an adhering cement of comminuted beryllium oxide and a high-temperature plastic binder for mechanically uniting the electrical unit to said chassis, said cement effectively adhering to both said unit and chassis so as to form both an electrically insulating barrier and a short and direct heat transfer path therebetween.

2. Electrical miniaturized apparatus as specified in claim 1 wherein the electrical unit is coated with said beryllium oxide cement and the cement directly unites said unit to a heat dissipating chassis composed of aluminum, said cement consisting of 60% to 95% comminuted beryllium oxide and 5% to 40% plastic binder of the high-temperature type.

References Cited by the Examiner
UNITED STATES PATENTS

| | | | |
|---|---|---|---|
| 2,651,007 | 9/53 | Shepard | 317—100 |
| 2,734,344 | 2/56 | Lindenblad | 260—37 |
| 2,740,905 | 4/56 | Henderson | 317—99 |
| 2,948,930 | 8/60 | Herbst | 260—37 |
| 3,020,451 | 2/62 | McAdams | 317—10 |
| 3,087,982 | 4/63 | Hayes | 174—35 |

OTHER REFERENCES

Electronic Design, January 1955, pp. 46, 47, Quayle and Hubelbart, Experimental Encapsulation Techniques.

JOHN F. BURNS, *Primary Examiner.*